United States Patent [19]
Cohen

[11] 3,858,988
[45] Jan. 7, 1975

[54] JOINT STRUCTURE

[76] Inventor: Melvin Cohen, 58 Heights Rd., Wayne, N.J.

[22] Filed: Feb. 7, 1973

[21] Appl. No.: 330,288

[52] U.S. Cl. .................. 403/18, 403/187, 403/329, 211/148
[51] Int. Cl. ........................................... F16b 9/00
[58] Field of Search ......... 403/11, 12, 18, 187, 188, 403/192, 230, 231, 321, 325, 326, 329; 211/148, 177

[56] References Cited
UNITED STATES PATENTS

| | | | |
|---|---|---|---|
| 2,933,196 | 4/1960 | Childs | 211/148 X |
| 3,055,462 | 9/1962 | Steele | 403/18 |
| 3,208,778 | 9/1965 | Gordon | 403/329 |
| 3,299,839 | 1/1967 | Nordbak | 211/148 X |
| 3,414,224 | 12/1968 | Robilliard et al. | 211/177 X |
| 3,456,970 | 7/1969 | Sunasky | 211/148 X |

Primary Examiner—Werner H. Schroeder
Attorney, Agent, or Firm—Kenneth S. Goldfarb

[57] ABSTRACT

A Joint Structure comprising a first member including four essentially L-shaped hooks and a spring biased plate, a second member having a plurality of apertures adapted to receive the four L-shaped hooks and the spring biased plate whereby the L-shaped hooks are rigidly held in a fixed position within the plurality of apertures by the spring biased plate.

4 Claims, 4 Drawing Figures

JOINT STRUCTURE

BACKGROUND OF THE INVENTION

1. Field of the Invention

This invention relates to joint structure.

2. Description of the Prior Art

In the past various joint structures, especially those employing nuts and bolts, have been used, which nuts and bolts may be loosened from repeated jerking forces or adverse movements which could cause collapse of the structure or machinery depending upon the immobile connection. This could also severely hamper any safety precautions. Such inadequacies of nuts and bolts, along with the fact that they are time consuming to install and require tools for engagement, strongly suggests that there be need for a more efficient means of securing in place two separate parts to form a joint or latching mechanism.

SUMMARY OF THE INVENTION

The present invention contemplates employing a first member having connected thereto a substantially U-shaped member with at least one, and preferably four, essentially L-shaped hooks, and a spring biased locking mechanism, which is preferably a resilient rectangular plate, firmly engaged between the first member and the substantially U-shaped member. A second tubular member is provided which is preferably rectangular in cross section having a plurality of apertures adapted to receive the L-shaped hooks and rigidly held in a fixed position within the plurality of apertures by the resilient rectangular plate.

It is an object of the present invention to provide an easily erected and disassembled joint structure which can quickly be secured without the use of the tools.

Still further objects of the present invention are to provide an adjustable joint structure which remains immobile and essentially invulnerable, rigidly and sturdily set in place, yet may be readily disassembled and which is relatively inexpensive, and requires no skill or tools for erection, and which is especially adapted for rapid erection of display stand, partitions, racks, advertising signs and displays and the like.

These together with the various ancillary objects and features which will become apparent as the following description proceeds, are attained by this novel joint structure, a preferred embodiment of which is shown in the accompanying drawing, by way of example only, wherein:

DETAILED DESCRIPTION OF THE INVENTION

Figure 1:
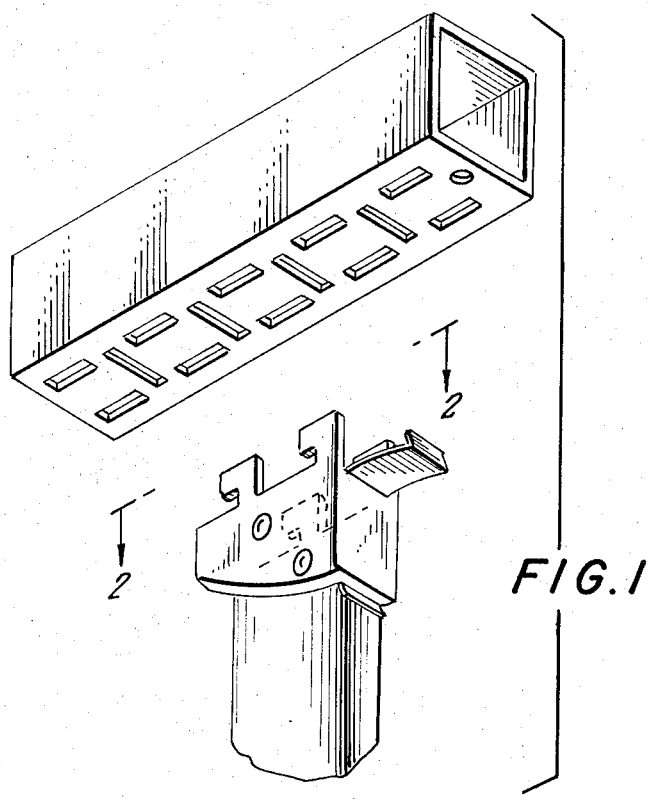
FIG. 1 is an exploded perspective view of the invention.
Figure 2:
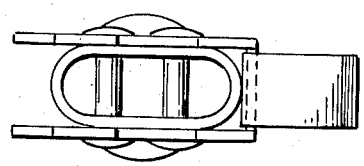
FIG. 2 is a bottom plan view of one of the members looking in the direction of the arrows 2—2 in FIG. 1.

Referring now to the drawings wherein like reference numerals designate identical parts throughout the various views, reference numeral 20 designates a first member 20 in the form of a bar, beam or other support of a rectangular cross section and of box-like tubular configuration including a plurality of rectangular apertures 22. A second tubular member 24 having a substantially U-shaped member 26 with four integral L-shaped hooks 28 protruding therefrom. The member 26 is connected to the member 24 by revets means 30 and 32, and a spring biased locking mechanism 34 is held between members 26 and 24. The U-shaped member 26 has four L-shaped hooks 28, engageable in apertures 22. Preferably spring biased locking mechanism 34 is a resilient rectangular plate having an L-shaped end as shown for lodging into one of plurality of apertures 23.

Figure 3:
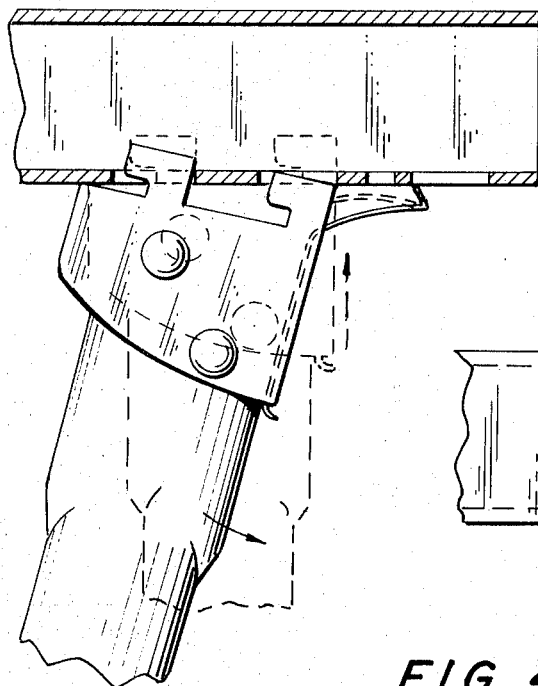
FIG. 3 is a vertical sectional view taken along the plane the axis of the joint structure and illustrates a step during the connection procedure for the joint structure, showing the final relative position of one member in broken lines.

FIG. 3 illustrates the manner in which the joint structure is attained. The hooks 28, protruding from arms of substantially U-shaped member 26 are inserted into the apertures 22 in a bayonet type fastening manner. The member 24 is thrust in the direction of arrow 36 while simultaneously rotationally pulling in the direction of arrow 38. This places spring like tension on resilient rectangular plate 34 since it is forced to bend against the side of first member 20. The dotted-line illustration of second member 24 is the final alignment position prior to complete engagement of the latching mechanism which is accomplished by the downward thrust in direction of arrow 40 in FIG. 4.

Figure 4:
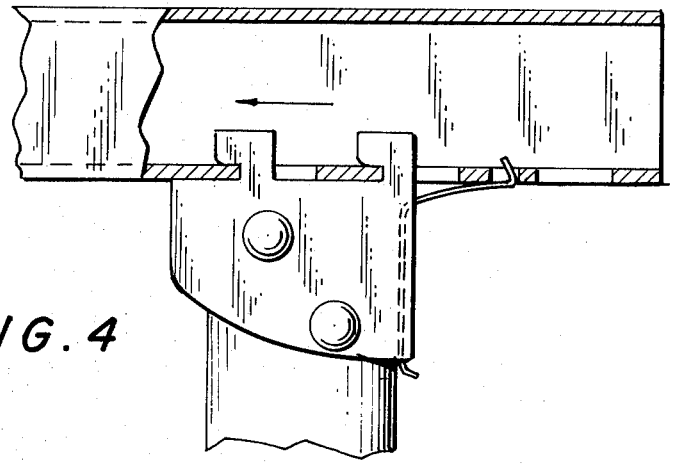
FIG. 4 is a side elevational view with parts broken away to show details of construction.

FIG. 4 illustrates the final locked position of the joint structure showing L-shaped hooks 28 lodged within apertures 22 and held rigidly in position by resilient rectangular plate 34 which is also lodged within one of plurality of apertures 23.

While the present invention has been described herein with reference to particular embodiments thereof, a latitude of modification, various changes and substitutions are intended in the foregoing disclosure, and it will be appreciated by those skilled in the art that in some instances some features of the invention will be employed without departing from the scope of the invention as set forth.

What is claimed is:

1. A joint structure comprising a first member including at least one L-shaped hook and a spring biased locking mechanism, a second member having a plurality of elongated rectangular apertures adapted to receive said L-shaped hook and said spring biased locking mechanism whereby said L-shaped hook is rigidly held in fixed position within at least one of said plurality of apertures by said spring biased locking mechanism, said second member being a rectangular tube having at least one of said rectangular apertures parallel thereto in one of its four sides and the longitudinal edge of said rectangular aperture being parallel to the longitudinal edges of said tube and receiving said hook, said spring biased locking mechanism being a resilient rectangular plate having one L-shaped end which lodges into one of said plurality of apertures to rigidly secure said L-shaped hook with said second member, and at least one of said rectangular apertures extending transverse to the longitudinal edge of said tube and receiving said L-shaped end of said rectangular plate.

2. The joint structure of claim 1, wherein said first member includes a substantially U-shaped member having four L-shaped hooks, and a connection means for connecting said U-shaped member to said first member.

3. The joint structure of claim 2 wherein said resilient rectangular plate is firmly engaged between said U-shaped member and said first member.

4. The joint structure of claim 3 wherein said connection means are a pair of rivets.

* * * * *